US009665197B2

(12) United States Patent
Haffenden et al.

(10) Patent No.: US 9,665,197 B2
(45) Date of Patent: May 30, 2017

(54) APPARATUS AND METHOD FOR ENABLING USER INPUT

(75) Inventors: Ian Haffenden, Hampshire (GB); Andrew Robinson, Surrey (GB); David Keller, Murrieta, CA (US); Graham Clay, Hants (GB)

(73) Assignee: Nokia Technologies Oy, Espoo (FI)

( * ) Notice: Subject to any disclaimer, the term of this patent is extended or adjusted under 35 U.S.C. 154(b) by 1453 days.

(21) Appl. No.: 12/012,015

(22) Filed: Jan. 30, 2008

(65) Prior Publication Data

US 2009/0189866 A1    Jul. 30, 2009

(51) Int. Cl.
*G06F 1/00* (2006.01)
*G06F 3/041* (2006.01)

(52) U.S. Cl.
CPC .................................. *G06F 3/0414* (2013.01)

(58) Field of Classification Search
CPC .................................. G02B 6/26; G02F 1/295
USPC .......................................................... 345/173
See application file for complete search history.

(56) References Cited

U.S. PATENT DOCUMENTS

| 4,644,101 | A | 2/1987 | Jin et al. ........................ 178/18 |
| 5,742,222 | A | 4/1998 | Young et al. .................... 338/2 |
| 5,801,682 | A | 9/1998 | Coni et al. ................... 345/174 |
| 6,504,530 | B1* | 1/2003 | Wilson et al. ............... 345/173 |
| 2004/0061687 | A1* | 4/2004 | Kent et al. .................... 345/173 |
| 2004/0165815 | A1* | 8/2004 | Kitagawa ............... G02F 1/035 385/16 |
| 2008/0143689 | A1* | 6/2008 | Foo et al. ..................... 345/174 |
| 2008/0231605 | A1* | 9/2008 | Yang ............................ 345/173 |

FOREIGN PATENT DOCUMENTS

| EP | 1 496 425 A1 | 1/2005 |
| WO | WO 02/35460 A1 | 5/2002 |
| WO | WO-2006/013520 A2 | 2/2006 |

* cited by examiner

*Primary Examiner* — Michael Faragalla
(74) *Attorney, Agent, or Firm* — Harrington & Smith (57) ABSTRACT

An apparatus including: a display including an array of picture elements which are configurable to provide information to a user; a first sensor for sensing force applied to the display by the user, the first sensor comprising a substantially transparent conductive member extending over at least a portion of the array of picture elements and configured to be deformable by the user, the first sensor being configured to provide an output associated with the deformation of the conductive member.

23 Claims, 6 Drawing Sheets

APPARATUS AND METHOD FOR ENABLING USER INPUT

FIELD OF THE INVENTION

Embodiments of the present invention relate to an apparatus and method for enabling user input. In particular, they relate to an apparatus and method for enabling user input in a mobile cellular telephone.

BACKGROUND TO THE INVENTION

Apparatus, such as portable communication devices (e.g. mobile cellular telephones) usually include a user input device which enables a user to control a graphical user interface displayed on the display of the apparatus. One form of such a user input device is a touch screen display. Touch screen displays enable a user to provide an input directly to the display (e.g. by using their finger tip) to select options displayed on the display and to control the position of a cursor displayed on the display.

The operation of a touch screen display may present a challenge to a user of the apparatus. For example, capacitive touch sensors are usually configured to sense when a user's finger makes physical contact with the display. However, capacitive touch sensors are not configured to determine the force of the user input and consequently, an input may be erroneously detected if the user accidentally makes physical contact with the display.

Therefore, it would be desirable to provide an alternative apparatus.

BRIEF DESCRIPTION OF VARIOUS EMBODIMENTS OF THE INVENTION

According to various embodiments of the invention there is provided an apparatus comprising: a display including an array of picture elements which are configurable to provide information to a user; a first sensor for sensing force applied to the display by the user, the first sensor comprising a substantially transparent conductive member extending over at least a portion of the array of picture elements and configured to be deformable by the user, the first sensor being configured to provide an output associated with the deformation of the conductive member.

The apparatus may be for wireless communications.

The apparatus may further comprise a controller for receiving the output from the first sensor. The controller may be configured to recognize the force applied to the display as a user input if the output from the first sensor is above a predetermined threshold. Alternatively or in addition, the controller may be configured to variably control a graphical user interface displayed on the display dependent on the output received from the first sensor.

The apparatus may further comprise a second sensor for sensing the position of an input to the display by the user and for providing an output associated with the sensed position of the user input. The second sensor may be a capacitive touch sensor. The conductive member of the first sensor may be configured to provide a ground plane for the capacitive touch sensor.

The conductive member of the first sensor may be positionable where the user is most likely to provide a force to the array of picture elements of the display.

The conductive member of the first sensor may be arranged to extend over substantially all of the picture elements of the display.

The conductive member may comprise indium tin oxide. Alternatively, the conductive member may comprise a conductive polymer.

The first sensor may be a strain gauge sensor.

According to various embodiments of the invention, there is provided a portable electronic device comprising the apparatus as described in any of the preceding paragraphs.

According to various embodiments of the invention, there is provided a module comprising an apparatus as described in any of the preceding paragraphs.

According to various embodiments of the invention, there is provided a method comprising: providing a display including an array of picture elements which are configurable to provide information to a user; a first sensor for sensing force applied to the display by the user, the first sensor comprising a substantially transparent conductive member; and arranging the conductive member to extend over at least a portion of the array of picture elements and configured to be deformable by the user, the first sensor being configured to provide an output associated with the deformation of the conductive member.

The method may further comprise providing a controller for receiving the output from the first sensor. The method may further comprise configuring the controller to recognize the force applied to the display as a user input if the output from the first sensor is above a predetermined threshold. Alternatively or in addition, the method may further comprise configuring the controller to variably control a graphical user interface displayed on the display dependent on the output received from the first sensor.

The method may further comprise providing a second sensor for sensing the position of an input to the display by the user and for providing an output associated with the sensed position of the user input.

The second sensor may be a capacitive touch sensor. The method may further comprise configuring the conductive member of the first sensor to provide a ground plane for the capacitive touch sensor.

The method may further comprise positioning the conductive member of the first sensor to where the user is most likely to provide a force to the array of picture elements of the display.

The method may further comprise arranging the conductive member of the first sensor to extend over substantially all of the picture elements of the display.

The conductive member may comprise indium tin oxide. Alternatively, the conductive member may comprise a conductive polymer.

The first sensor may be a strain gauge sensor.

According to various embodiments of the invention, there is provided an apparatus comprising: a display means, including an array of picture elements, for providing information to a user; a first sensor means for sensing force applied to the display by the user, the first sensor means comprising a substantially transparent conductive member extending over at least a portion of the array of picture elements and configured to be deformable by the user, the first sensor means for providing an output associated with the deformation of the conductive member.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

FIGS. 1, 2A, 2B, 3 and 4A illustrate an apparatus 10 comprising: a display 30 including an array of picture elements 34 which are configurable to provide information to a user; a first sensor 32 for sensing force applied to the display 30 by the user, the first sensor 32 comprising a substantially transparent conductive member 46 extending over at least a portion of the array of picture elements 34 and configured to be deformable by the user, the first sensor 32 being configured to provide an output associated with the deformation of the conductive member 46.

Figure 1:
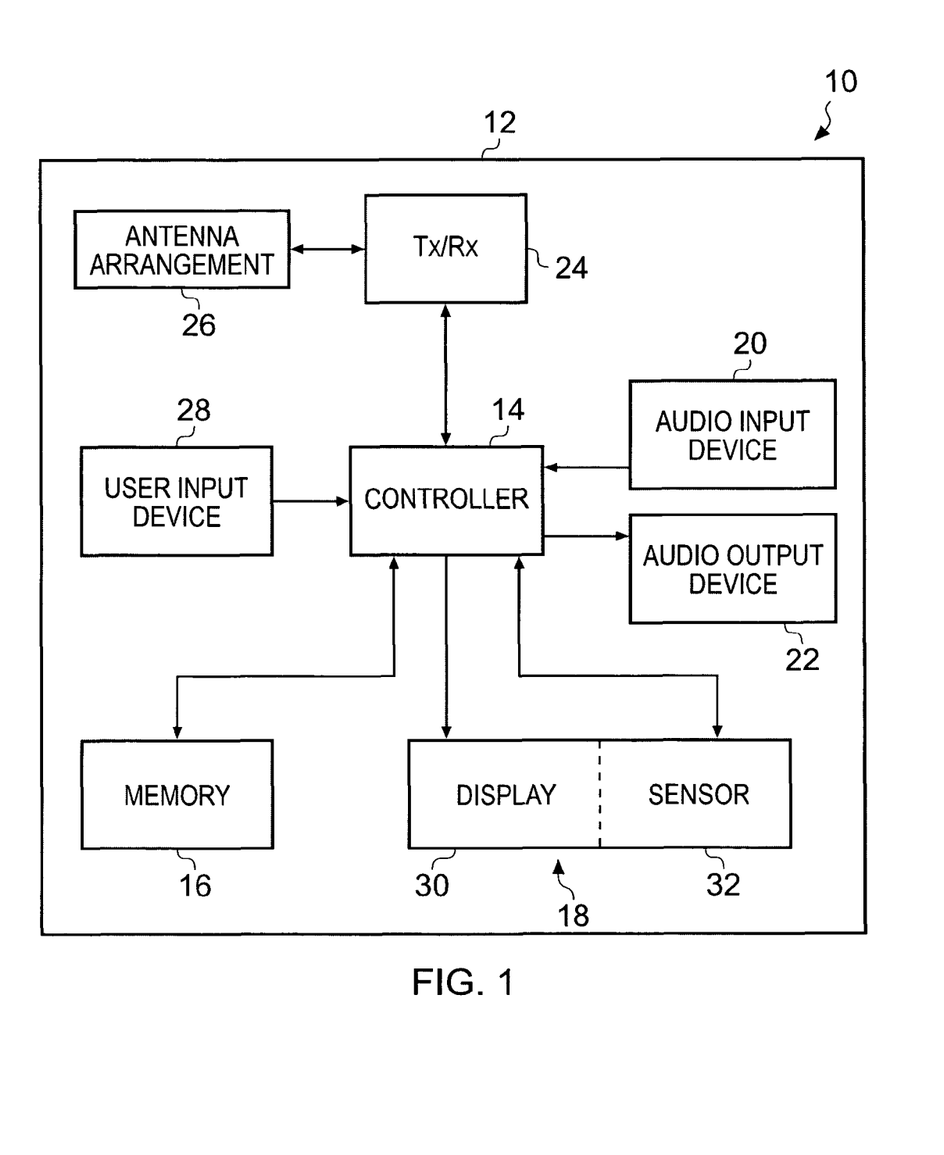
FIG. 1 illustrates a schematic diagram of an apparatus according to various embodiments of the present invention.

FIG. 1 illustrates a schematic diagram of various embodiments of an apparatus 10. In more detail, the apparatus 10 includes a housing 12 which houses a controller 14, a memory 16, a touch screen display 18, an audio output device 20, an audio input device 22, a transceiver 24, an antenna arrangement 26 and a user input device 28.

The apparatus 10 may be any electronic device and may be, for example, a portable electronic device such as a mobile cellular telephone; an arcade game console; an Automated Teller Machine (ATM) or a television. It should be appreciated that at least some of the above features may or may not be included in different electronic devices. In the following embodiment which is described in detail with reference to FIG. 1, the apparatus 10 is a mobile cellular telephone.

The controller 14 may be any suitable processor and is, in this embodiment, a microprocessor. The controller 14 is connected to read from and write to the memory 16. The memory 16 may be any suitable memory and may, for example be permanent built-in memory such as flash memory or it may be a removable memory such as a hard disk, secure digital (SD) card or a micro-drive.

The touch screen display 18 comprises a display 30 and a sensor 32. The display 30 is coupled to the controller 14 for receiving and displaying data. The controller 14 may read data from the memory 16 and provide it to the display 30 for display to a user of the cellular telephone 10. The display 16 may be any suitable display and may be for example, a thin film transistor (TFT) display, a liquid crystal display (LCD), a light emitting diode (LED) display (e.g. an organic light emitting diode (OLED) display) or a cathode ray tube (CRT) display.

Figure 2A:
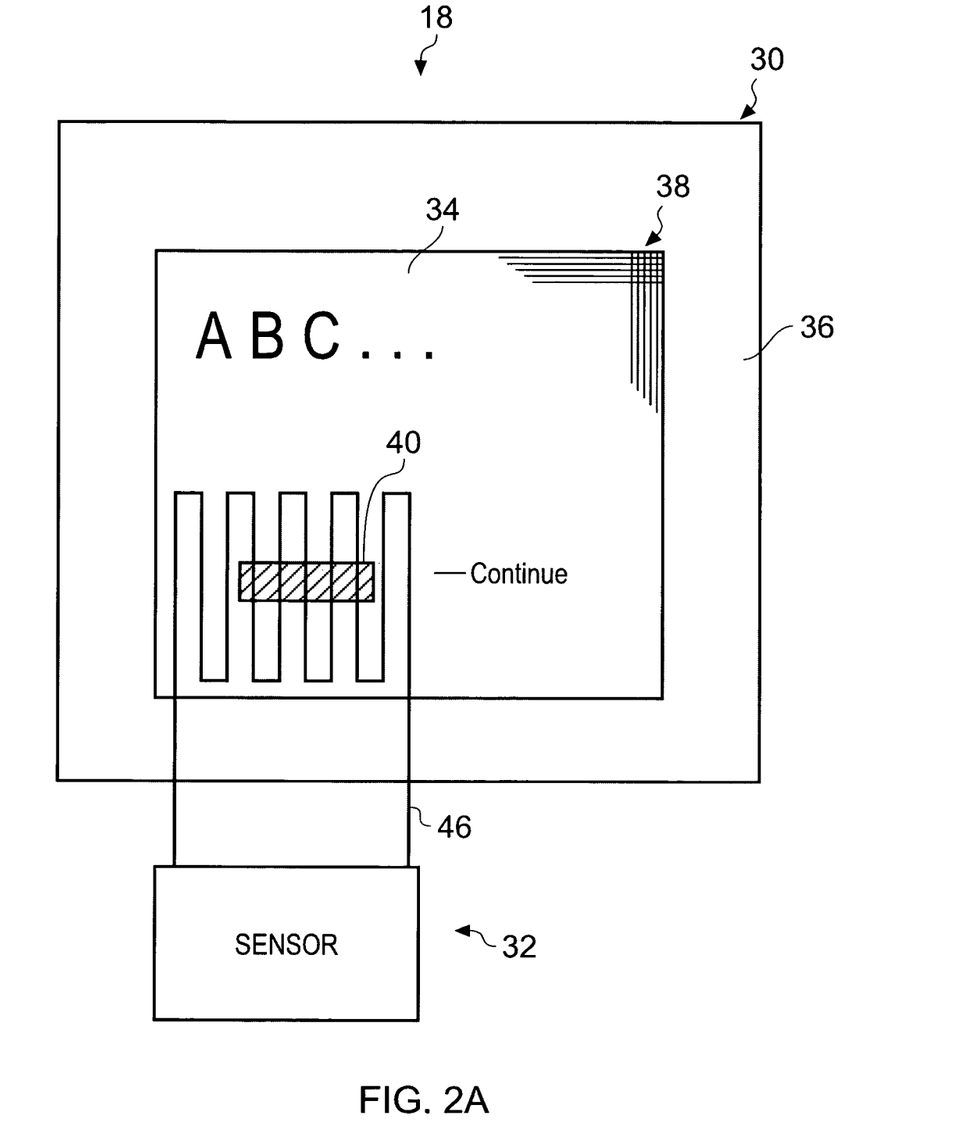
FIG. 2A illustrates a schematic plan view of a touch screen display according to various embodiments of the present invention.
Figure 2B:
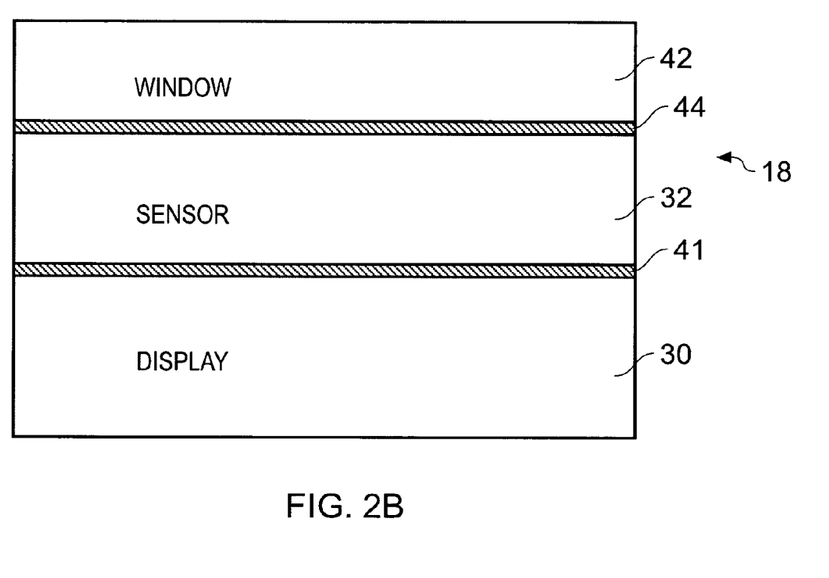
FIG. 2B illustrates a schematic cross sectional side view of the touch screen display illustrated in FIG. 2A.

The sensor 32 is configured to sense the application of force by a user on the touch screen display 18 and output control signals associated with the sensed force to the controller 14. The controller 14 is configured to control the display 30 using the control signals received from the sensor 32. The sensor 32 is discussed in greater detail in the following paragraphs with reference to FIG. 2.

It should be appreciated that the wording 'touch screen display' does not limit the touch screen display 18 to only being capable of sensing an input from a user's finger tip. A user may provide an input to the touch screen display 18 using any suitable means, e.g. a touch screen pen.

The controller 14 is arranged to provide audio data to the audio output device 22. The audio output device 22 is arranged to convert the audio data into acoustic waves, audible to the user of the cellular telephone 10. The audio output device 22 may be, for example, a loudspeaker.

The audio input device 20 is arranged to convert acoustic waves (for example, a voice of a user) into an electrical signal for input to the controller 14. The audio input device 20 is in this embodiment a microphone.

The transceiver 24 is connected to the antenna arrangement 26 and to the controller 14. The controller 14 is arranged to provide data to the transceiver 24. The transceiver 24 is arranged to encode the data and provide it to the antenna arrangement 26 for transmission. The antenna arrangement 26 is arranged to transmit the encoded data as a radio signal. The antenna arrangement 26 is also arranged to receive a radio signal. The antenna arrangement 26 then provides the received radio signal to the transceiver 24 which decodes the radio signal into data. The transceiver 24 then provides the data to the controller 14. In this embodiment, the radio signal has a frequency within a licensed cellular frequency band (for example, within a GSM frequency band (e.g. 900 MHz)).

In various embodiments, the mobile cellular telephone 10 may also include a user input device 28 which is operable by a user to provide control signals to the controller 14. The user input device 28 may be used to supplement the control provided by the touch screen display 18.

FIGS. 2A and 2B illustrate a touch screen display 18 comprising a display 30 and a sensor 32 according to various embodiments of the present invention. Where the features illustrated in FIGS. 2A and 2B are similar to those illustrated in FIG. 1, the same reference numerals are used.

The display 30 includes an array of picture elements (pixels) 34 which are configured to provide information to a user of the touch screen display 18, and a frame 36 which extends around the periphery of the array of picture elements 34. Only a subset 38 of the array of picture elements 34 is illustrated in FIG. 2A for clarity reasons and it should be appreciated that the array of picture elements 34 extends to the border between the array 34 and the frame 36.

As illustrated in FIG. 2B, the sensor 32 overlays the display 30 so that when the user is viewing the display 30, the sensor 32 is positioned between the display 30 and the user. The sensor 32 may be coupled to the display 30 via an adhesive layer 41. A transparent window 42 (for example comprising glass) is coupled to the sensor 32 via an adhesive layer 44 and overlays the sensor 32. The window 42 is substantially transparent thereby allowing the user to the view the display 30 through the window 42.

Referring now to FIG. 2A, the sensor 32 includes a substantially transparent conductive member 46 which extends over at least a portion of the array of picture elements 34. In this embodiment, the conductive member 46 is a conductive track which extends between two terminals and is arranged in a serpentine configuration. It should be appreciated that the conductive member 46 may have other configurations in other embodiments. The conductive member 46 comprises a substantially transparent conductive material such as indium tin oxide, aluminum doped zinc oxide or a conductive polymer such as Poly(3,4-ethylenedioxythiophene) or Poly(3,4-ethylenedioxythiophene) poly (styrenesulfonate).

The sensor 32 is a strain gauge sensor and is operable to sense the force applied to the touch screen display 18 by a user. When a user provides a force to the window 42 of the touch screen display 18, the conductive member 46 may be deformed. It should be appreciated that the extent of deformation of the conductive member 46 is dependent upon (at least in part) by the location of the force applied by the user and that if the user provides a force directly above the conductive member 46, the deformation of the conductive member 46 may be maximized.

The deformation of the conductive member 46 changes the dimensions and consequently, the electrical resistance of the conductive member 46. In use, a fixed voltage may be applied across the conductive member 46 and when the conductive member 46 is deformed, the deformation is sensed as a change in the resistance of the conductive member (e.g. the resistance may be determined by using a Wheatstone bridge electrical circuit). This information is then output by the sensor 32 as a control signal to the controller 14. The output control signal may be variable depending upon the extent of the deformation of the conductive member 46.

In FIG. 2A, the array of picture elements 34 are configured to convey the text 'A B C', a button 40 and the text 'Continue' which is associated with the button 40 to the user. The conductive member 46 overlays the array of picture elements which form the image of the button 46. In order to execute the 'Continue' button 40, a user may provide a force to the portion of the window 42 overlaying the image of the button 40 and thereby deform the conductive member 46. The sensor 32 senses the deformation of the conductive member 46 and provides an output control signal to the controller 14. The controller 14 receives the control signal from the sensor 32 and may determine whether or not the control signal is above a predetermined threshold value. If the control signal is above a predetermined threshold value, the controller 14 recognizes that the force provided is a user input and controls the display 30 to provide different information to the user of the apparatus 10. If the control signal is below the predetermined threshold value, the controller 14 does not recognize the force provided as a user input and does not provide a control signal to the display 30.

Embodiments of the present invention provide an advantage in that since the conductive member 46 of the sensor 32 is substantially transparent, it can be configured to overlay any part of the array of pictures elements 34 without causing any substantial deterioration to the visual quality of the information conveyed by the array of picture elements 34. If a manufacturer is aware that a particular portion of the touch screen display 18 will receive a large number of user inputs, the conductive member 46 can be arranged to extend to that particular portion of the display 18. This may result in a more sensitive touch screen display 18 because the conductive member 46 is positioned directly underneath the location where the user may be most likely to provide an input force.

Figure 3:
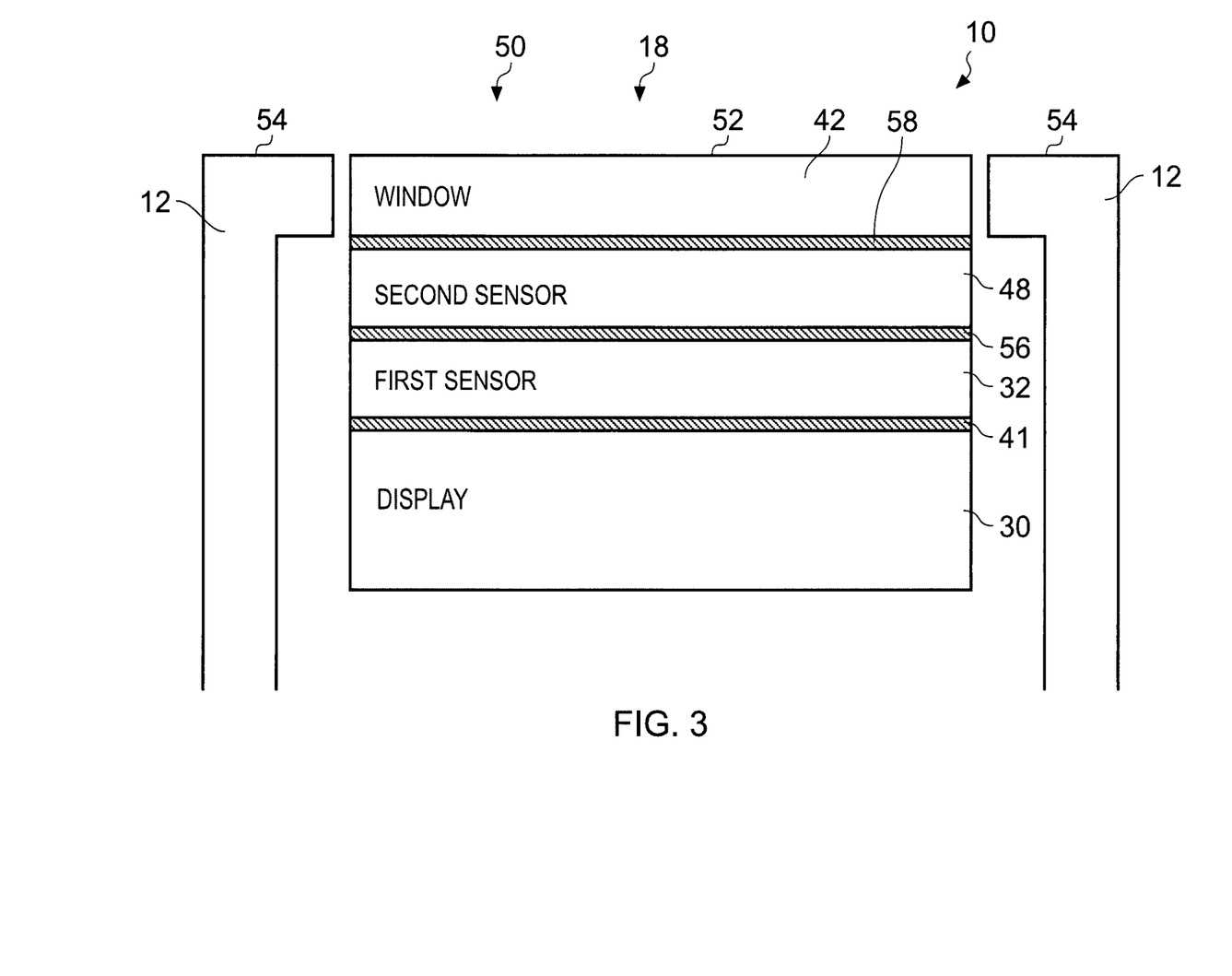
FIG. 3 illustrates a schematic cross sectional side view of a touch screen display according to various embodiments of the present invention.

FIG. 3 illustrates a cross sectional side view of another embodiment of a touch screen display 18. Where the features illustrated in FIG. 3 are similar to those illustrated in FIGS. 1, 2A and 2B, the same reference numerals are used.

The touch screen display 18 includes a display 30, a first sensor 32, a second sensor 48 and a substantially transparent window 42 and is positioned within an aperture 50 in the housing 12 of the apparatus 10. The touch screen display 18 is arranged so that the upper surface 52 of the window 42 is substantially flush with the outer surface 54 of the housing 12. The display 30 is coupled to the first sensor 32 via an adhesive layer 41, the first sensor 32 is coupled to the second sensor 48 via an adhesive layer 56 and the second sensor 48 is coupled to the window 42 via an adhesive layer 58.

Figure 4A:
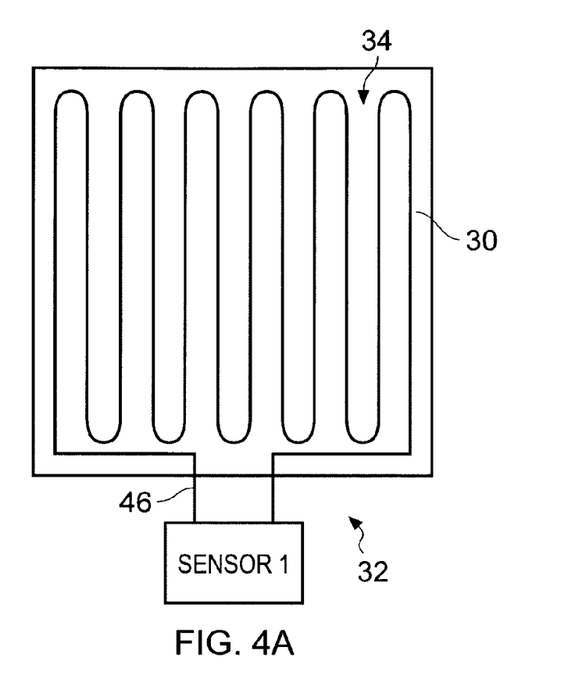
FIG. 4A illustrates a plan view diagram of the first sensor illustrated in FIG. 3 according to various embodiments of the present invention.

FIG. 4A illustrates a plan view of the first sensor 32 which includes a substantially transparent conductive member 46 which extends between two terminals and is arranged in a serpentine configuration. The first sensor 32 is similar to the sensor 32 illustrated in FIGS. 2A and 2B but differs in that the conductive member 46 overlays substantially the whole array of picture elements 34 of the display 30.

Figure 4B:
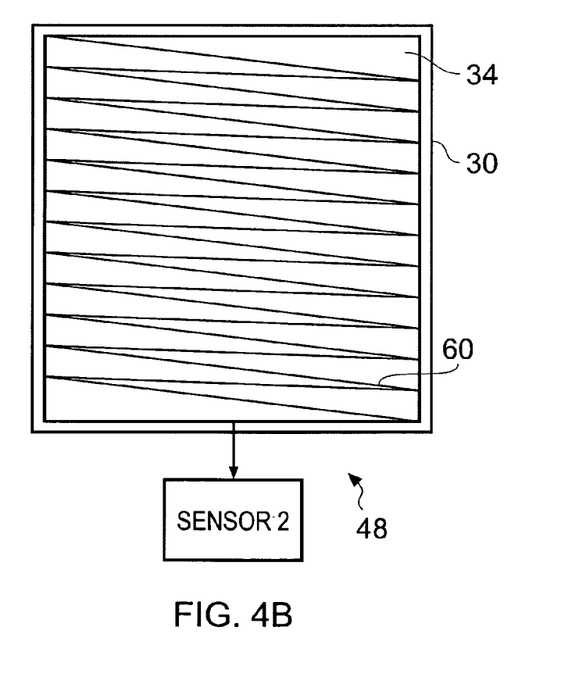
FIG. 4B illustrates a plan view diagram of the second sensor illustrated in FIG. 3 according to various embodiments of the present invention.

With reference to FIGS. 3 and 4B, the second sensor 48 may be any suitable sensor for determining the position of a user input on the touch screen display 18. For example, the second sensor 48 may be a capacitive touch sensor, an infrared sensor, a surface acoustic wave (SAW) sensor, an optical imaging sensor, a dispersive signal technology sensor, an acoustic pulse recognition sensor, a frustrated total internal reflection sensor or a resistive sensor. The second sensor 48 is configured to determine the position of a user input on the touch screen display 18 and provide this information as a control signal to the controller 14.

In the embodiment where the second sensor 48 is a capacitive touch sensor, the capacitive touch sensor 48 comprises a conductive track 60 which extends over substantially the whole array of picture elements 34 and includes indium tin oxide. Capacitive touch sensors are well known in the art of touch screen displays and will consequently not be discussed in detail here. Briefly, an electrical current is provided to the conductive track 60 which generates a capacitive reference state. When an object having a capacitance (e.g. a user's finger) is brought in proximity to the conductive track 60, the capacitive reference state of the conductive track 60 is altered. The alteration of the capacitive reference state is output to the controller 14 which then determines the position of the user's input.

The conductive member 46 of the first sensor 32 may be arranged to provide a ground plane for the capacitive sensor 48. If the spacing between the sections of track of the conductive member 46 are selected so that they are smaller than the wavelength of the electromagnetic signals emitted from within the apparatus 10, the conductive member 46 may act as an electromagnetic shield for the capacitive sensor 48 and prevents electromagnetic signals emitted from within the apparatus from interfering with the operation of the capacitive sensor 48. This provides an advantage in that it may remove the need to provide a separate ground plane for the capacitive sensor. This may reduce the dimensions and cost of the touch screen display 18.

Embodiments of the present invention provide an advantage in that the first sensor 32 may be used to validate the detection of a user input by the second sensor 48. In the embodiment where the second sensor is a capacitive touch sensor, the capacitive touch sensor may provide a control signal to the controller 14 indicating that the user has provided an input at a particular location (capacitive touch sensors are usually very sensitive and may only require a user to make light physical contact with the touch screen display). The controller 14 can determine if this information is correct by comparing it against the output received from the first sensor 32. If the output from the first sensor 32 is above a predetermined threshold value, then the controller 14 recognizes the information provided by the second sensor 48 as a user input and controls the display 30 accordingly (e.g. to provide different information to the user). If the output received from the first sensor 32 is below the predetermined threshold value, then the controller 14 ignores the information provided by the second sensor and does not register the sensed position as a user input.

Embodiments of the present invention also provide an advantage in that the variable output from the first sensor 32 may be used to provide variable control over a graphical user interface displayed on the display 30. For example, if the display 30 is controlled by the controller 14 to provide a three dimensional graphical user interface, use of the second sensor 48 may provide control of a user's view in a first axis and a second orthogonal axis. Use of the first sensor 32 may provide control of a user's view in a third axis, orthogonal to the first axis and to the second axis. Additionally, the controller 14 may move the user's view in the graphical user interface faster or slower depending on whether more or less force respectively is applied to the touch screen display 18.

Figure 5:
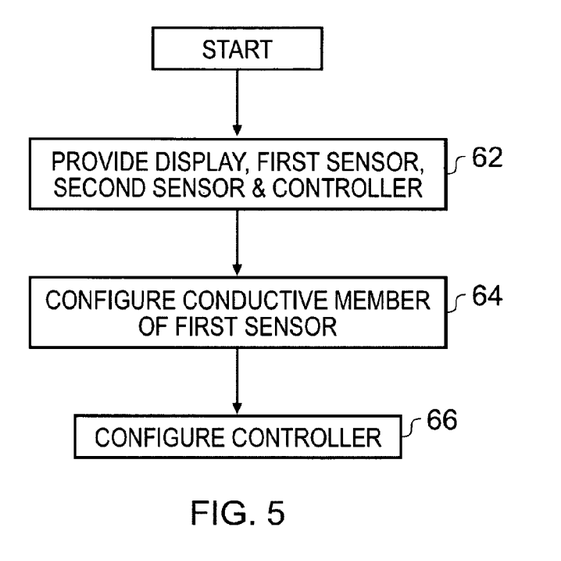
FIG. 5 illustrates a flow diagram of a process for manufacturing an apparatus according to various embodiments of the present invention.

FIG. 5 illustrates a flow diagram of a process for manufacturing an apparatus according to various embodiments of the present invention. At block 62, a display 30, a first sensor 32, a controller 14 and optionally, a second sensor 48 are provided.

At block 64, the substantially transparent conductive member 46 of the first sensor 32 is configured to extend over at least a portion of the array of the picture elements 34. Additionally, the conductive member 46 may also be configured to provide a ground plane for a capacitive second sensor 48 as described in the above paragraphs. Furthermore, the conductive member 46 of the first sensor 32 may be positioned where the user is most likely to provide a force to the array of picture elements 34 of the display 30. The conductive member 46 of the first sensor 32 may also be arranged to extend over substantially all of the picture elements of the display.

At block 66, the controller 14 is configured to receive the output from the first sensor 32 and to recognize the force applied to the display as a user input if the output from the first sensor is above a predetermined threshold. Additionally or alternatively, the controller 14 may be configured to variably control a graphical user interface displayed on the display 30 dependent on the output received from the first sensor 32 (e.g. the variable output from the first sensor 32 may be used to control the speed in a given axis in a three dimensional graphical user interface).

The illustration of a particular order to the blocks does not necessarily imply that there is a required or preferred order for the blocks and the order and arrangement of the blocks may be varied.

Although embodiments of the present invention have been described in the preceding paragraphs with reference to various examples, it should be appreciated that modifications to the examples given can be made without departing from the scope of the invention as claimed. For example the touch screen display 18 may comprise a plurality of first sensors 32 which may be used to determine the position and force of a user input to the touch screen display 18.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
    a first sensor configured to sense force applied to a display by a user, the display including an array of picture elements which are configurable to provide information to the user, the first sensor comprising a substantially transparent conductive member extending over at least a portion of the array of picture elements and configured to be deformable by the user, the first sensor being configured to provide an output associated with the deformation of the conductive member; and
    a second sensor, being a capacitive touch sensor configured to sense the position of an input to the display by the user and to provide an output associated with the sensed position of the user input,
    wherein the conductive member of the first sensor is configured to provide a ground plane for the capacitive touch sensor, and wherein the spacing between sections of the conductive member is smaller than the wavelength of electromagnetic waves emitted from within the apparatus.

2. An apparatus as claimed in claim 1, further comprising a controller configured to receive the output from the first sensor, the controller being configured to recognize the force applied to the display as a user input if the output from the first sensor is above a predetermined threshold.

3. An apparatus as claimed in claim 1, further comprising a controller configured to receive the output from the first sensor, the controller being configured to variably control a graphical user interface displayed on the display dependent on the output received from the first sensor.

4. An apparatus as claimed in claim 1, wherein the conductive member of the first sensor is positionable where the user is most likely to provide a force to the array of picture elements of the display.

5. An apparatus as claimed in claim 1, wherein the conductive member of the first sensor is arranged to extend over substantially all of the picture elements of the display.

6. An apparatus as claimed in claim 1, wherein the conductive member comprises indium tin oxide.

7. An apparatus as claimed in claim 1, wherein the conductive member comprises a conductive polymer.

8. An apparatus as claimed in claim 1, wherein the first sensor is a strain gauge sensor.

9. A portable electronic device comprising the apparatus as claimed in claim 1.

10. A module comprising an apparatus as claimed in claim 1.

11. A method comprising:
    providing a first sensor configured to sense force applied to a display by a user, the first sensor comprising a substantially transparent conductive member, the display including an array of picture elements which are configurable to provide information to the user;
    arranging the conductive member to extend over at least a portion of the array of picture elements and configured to be deformable by the user, the first sensor being configured to provide an output associated with the deformation of the conductive member;
    providing a second sensor, being a capacitive touch sensor configured to sense the position of an input to the display by the user and for providing an output associated with the sensed position of the user input; and
    wherein the conductive member of the first sensor is configured to provide a ground plane for the capacitive touch sensor, and wherein the spacing between sections of the conductive member is smaller than the wavelength of electromagnetic waves emitted from within the apparatus.

12. A method as claimed in claim 11, further comprising providing a controller for receiving the output from the first sensor; and configuring the controller to recognize the force applied to the display as a user input if the output from the first sensor is above a predetermined threshold.

13. A method as claimed in claim 11, further comprising providing a controller for receiving the output from the first sensor, configuring the controller to variably control a graphical user interface displayed on the display dependent on the output received from the first sensor.

14. A method as claimed in claim 11, further comprising positioning the conductive member of the first sensor to where the user is most likely to provide a force to the array of picture elements of the display.

15. A method as claimed in claim 11, further comprising arranging the conductive member of the first sensor to extend over substantially all of the picture elements of the display.

16. A method as claimed in claim 11, wherein the conductive member comprises indium tin oxide.

17. A method as claimed in claim 11, wherein the conductive member comprises a conductive polymer.

18. A method as claimed in claim 11, wherein the first sensor is a strain gauge sensor.

19. An apparatus comprising:
a display means; including an array of picture elements, for providing information to a user;
a first sensor means for sensing force applied to the display by the user, the first sensor means comprising a substantially transparent conductive member extending over at least a portion of the array of picture elements and configured to be deformable by the user, the first sensor means for providing an output associated with the deformation of the conductive member;
a second sensor means, being a capacitive touch sensor means for sensing the position of an input to the display means by the user and for providing an output associated with the sensed position of the user input; and
wherein the conductive member of the first sensor means is configured to provide a ground plane for the capacitive touch sensor means, and wherein the spacing between sections of the conductive member is smaller than the wavelength of electromagnetic waves emitted from within the apparatus.

20. An apparatus as claimed in claim 1, further comprising a display including the array of picture elements which are configurable to provide information to a user.

21. A method as claimed in claim 11, further comprising providing a display including the array of picture elements which are configurable to provide information to a user.

22. An apparatus as claimed in claim 1, wherein the conductive member is a conductive track arranged in a serpentine configuration.

23. An apparatus as claimed in claim 22, wherein the spacing between sections of the conductive track is smaller than the wavelength of electromagnetic waves emitted by an antenna arrangement of the apparatus.

* * * * *